United States Patent [19]
Johnson et al.

[11] Patent Number: 5,974,052
[45] Date of Patent: Oct. 26, 1999

[54] FRAME RELAY ACCESS DEVICE AND METHOD FOR TRANSPORTING SS7 INFORMATION BETWEEN SIGNALING POINTS

[75] Inventors: Bruce E. Johnson, Shawnee, Kans.; Michael J. Mueller, Raleigh, N.C.; Craig C. Pedersen, Raleigh, N.C.; Virgil E. Long, Raleigh, N.C.; Venkataramaiah Ravishankar, Apex, N.C.; Jesse Sherwood, Stillwell, Kans.

[73] Assignee: U.S.T.N. Services, Overland Park, Kans.

[21] Appl. No.: 08/644,264

[22] Filed: May 10, 1996

[51] Int. Cl.⁶ ............................................. H04J 3/16
[52] U.S. Cl. .................................................. 370/467
[58] Field of Search ........................... 370/467, 395, 370/389, 352, 524, 522, 465, 466, 469, 473, 468, 521, 471, 474, 477, 401, 335, 537, 398, 397, 399; 379/230, 231, 219, 225, 232, 233, 234

[56] References Cited

U.S. PATENT DOCUMENTS

| | | | |
|---|---|---|---|
| 4,890,280 | 12/1989 | Hirata | 370/389 |
| 4,998,242 | 3/1991 | Upp | 370/395 |
| 5,056,084 | 10/1991 | Le Corre | 370/476 |
| 5,142,528 | 8/1992 | Kobayashi et al. | 370/465 |
| 5,251,207 | 10/1993 | Abensour et al. | 370/395 |
| 5,305,315 | 4/1994 | Young | 370/395 |
| 5,315,588 | 5/1994 | Kajiwara et al. | 370/395 |
| 5,327,421 | 7/1994 | Hiller et al. | 370/395 |
| 5,365,524 | 11/1994 | Hiller et al. | 370/395 |
| 5,384,840 | 1/1995 | Blatchford et al. | 379/229 |
| 5,392,402 | 2/1995 | Robrock, II | 340/825.52 |
| 5,425,029 | 6/1995 | Hluchyj et al. | 370/389 |

(List continued on next page.)

OTHER PUBLICATIONS

"An Overview of Signaling System No. 7", Modarressi et al, *Proceeding of the IEEE,* vol. 80, No. 4, pp. 425–441.
"Introduction to the Digital Data System (DDS)", *Hewlett Packard,* pp. 3–46.

(List continued on next page.)

Primary Examiner—Dang Ton
Attorney, Agent, or Firm—Nixon & Vanderhye P.C.

[57] ABSTRACT

An enhanced frame relay access device (FRAD) capable of bidirectional interfacing between Signaling System No. 7 (SS7) protocol and Frame Relay protocol is utilized to economically transport SS7 signaling and link management information between SS7 networks via a Frame Relay protocol digital communications network. In an outgoing data transfer, the enhanced SS7 FRAD interface determines and eliminates redundant signaling unit information found in an SS7 data stream before packaging the essential information into a frame "payload" and introducing the frame into the Frame Relay network. For incoming data transfers, the SS7 FRAD extracts the frame payload data and regenerates the appropriate SS7 signaling units to maintain a continuous and synchronous data stream on the SS7 network. In the event communications with an SS7 facility is not possible (for example, an SS7 network or facility is down), the SS7 FRAD communicates its operational status to other SS7 FRADs by sending a proprietary coordination and status information frame across the Frame Relay network. A plurality of SS7 FRADs are configurable to provide multiple efficient links between different SS7 facilities over the Frame Relay network. In addition, each FRAD is individually customized to provide special functions such as encryption/decryption and data compression/decompression.

2 Claims, 14 Drawing Sheets

U.S. PATENT DOCUMENTS

| | | | |
|---|---|---|---|
| 5,473,679 | 12/1995 | La Porta et al. | 379/201 |
| 5,610,918 | 3/1997 | Kamo et al. | 370/395 |
| 5,809,012 | 9/1998 | Takase et al. | 370/445 |

OTHER PUBLICATIONS

Press Release, Mar. 28, 1996, "Compression Technologies Inc. Announces World's First Frame Relay Data Communication Device with Compression, Encryption, and TI/Ei Features" (4 Pages).

Chapters 2–8. CCITT Signaling System No. 7, pp. 138–171.

Table of Contents, pp. ix–xxxi.

2. Signaling, pp. 81–87.

"Signaling System 7", Jeff Hewlett, Apr. 1996, *Electronics Now*, pp. 29–30; 54–61.

Generic Requirements for CCS Nodes Supporting ATM High–Speed Signaling Links (HSLS), *Bellcore,* Issue 1, Nov., 1995. (16 pages).

FRAME RELAY ACCESS DEVICE AND METHOD FOR TRANSPORTING SS7 INFORMATION BETWEEN SIGNALING POINTS

FIELD OF THE INVENTION

The present invention generally relates to digital data communications networks and, in particular to a method and apparatus for telecommunications signaling. More specifically, the invention relates to frame relay access devices and an arrangement permitting use of conventional Frame Relay networks to economically transport SS7 signaling and link management information between SS7 facilities. Still more particularly, the present invention relates to an enhanced frame relay access device (FRAD) capable of interfacing between an SS7 network and a Frame Relay network.

BACKGROUND AND SUMMARY OF THE INVENTION

During the last half-decade "fast packet" multiplexing specifications and "frame switching" services such as Frame Relay (FR) have become increasingly popular as an efficient and economical means to transport large quantities of data across existing wide area digital data transmission networks (WANs). This is due, at least in part, to the fact that a frame switching approach to digital data transmissions necessarily limits each user of the network to only an amount of bandwidth actually needed for a particular given communication, thus, freeing up bandwidth for other users. In a frame switching scheme, digital data is communicated throughout the digital network in bursts or packets called "frames" which are variable in size. The Frame Relay packet data protocol now used to access many WANs evolved from the well known CCITT (now known as the International Telecommunications Union - Telecommunications Standardization Sector or ITU-TS) X.25 packet interface specification by removing certain features that are no longer needed given the many recent improvements in digital signal transmission technology. Essentially, the ITU-TS Frame Relay access interface protocol is similar to statistical multiplexing with the added condition that each frame contains information from only one user. The Frame Relay protocol as provided by ITU-TS recommendations 1.441, Q.921 and ANSI Ti.602, which are hereby incorporated by reference, provide the definition for the arrangement of digital information within a frame. Basically, each frame packet is composed of three parts: 1) an address, 2) a variable-length information field or "payload" and 3) a CRC or checksum for error checking (as illustrated, for example, in FIG. 3).

Physically, a conventional Frame Relay network is implemented by interconnecting Frame Relay access/interface "nodes" with a wide area digital data transmission network. At each Frame Relay node there are interface connections to users and/or switches to other nodes. The protocol and the arrangement of the physical network is designed so as to allow a user to reach many other users through a single connection to the network by simply changing the frame address. The Frame Relay network of itself does not terminate or process any protocol nor change or interpret the user data transported. Frame Relay is transparent to user data. A Frame Relay switch at a node either sends (relays) a particular frame over a particular network connection based on the frame address and a set of routing tables relating addresses to specific network connections or else discards the frame for any form of error. Consequently, Frame Relay is basically a "connection-oriented" protocol that establishes a logical connection for the duration of the communication and is currently implemented only as a permanent virtual circuit (PVC) service. (SVC service will probably exist in the future).

Although the Frame Relay protocol and network offers an economical alternative data transport mechanism, much of the installed data terminal equipment (DTE) of preexisting local area networks (LANs) cannot access a Frame Relay network because the DTE of the local network lacks support for the protocol. An external device called a Frame Relay Access Device (FRAD) solves this problem by functioning as an interface between a Frame Relay network and other existing data sources. Typical data source protocols supported by conventional FRADs include X.25, TCP/IP/Ethernet, SNA, Token Ring, and High Level Data Link Control (HDLC). However, as of this writing, applicants are aware of no commercially available FRAD which supports the SS7 (Signaling System No. 7) protocol.

The ITU-TS Signaling System No. 7 (SSN7 or SS7) protocol is currently implemented worldwide as the signaling system protocol for most digital telco trunk systems. Within the United States, the standard for telco network signaling is the so called SS7 protocol, as defined by ANSI standards Nos. T1.110 through T1.116, hereby incorporated herein by reference. Basically, SS7 is a general purpose common channel signaling (CCS) protocol. By definition, in a CCS signaling method a single channel conveys, by means of labeled messages, signaling information related to a multiplicity of circuits, or other information such as that used for network management. CCS can be regarded as a form of data communication that is specialized for various types of signaling and information transfers between processors in telecommunication networks. The SS7 protocol for CCS is optimized for operation over 64 kbps and 56 kbps digital channels, although it is also employed over analog channels at lower data rates (e.g.,4.8 kbps).

Telecommunications (telco) networks, as distinguished from digital data transport networks, actually comprise two logical networks. The first, conventionally referred to as a "transport" network, is a network which carries voice, data and other subscriber oriented signals between communications endpoints. The second is a digital signaling network over which various network elements communicate signaling messages to one another in order to control the operation of the transport network. Those elements include, for example, service switching points (SSPs) various databases or service control points (SC) deployed within the network and signaling transfer points (STPs), which route the signaling messages among the other elements. Thus, for example, messages transmitted over the signaling network are used to set up and tear down circuits interconnecting calling and called locations. They are also used to access and obtain information from such databases as calling card databases and databases which contain information about how to route "800" and other special service telephone calls.

Conventionally, a signaling system uses signaling links for transfer of signaling messages between SSPs and SCPs. Arrangements are provided to ensure reliable transfer of signaling information in the presence of transmission disturbances or network failures. These include error detection and correction on each signaling link. In addition, signaling systems of this sort usually must be equipped with a redundancy of signaling links, and include functions for automatic diversion of signaling traffic to alternative paths in case of link failure. Consequently, the operation of a telco signaling system with diverse facilities spread over a large geographical area or attempts to integrate separate or expand local regional signaling systems into a large WAN can be prohibitively expensive and difficult to maintain. A cost effective and low maintenance alternative mechanism for interconnecting and expanding telco signaling systems would provide a much needed solution.

Since frame switching services have grown in popularity and reliability, digital data transmission networks employing Frame Relay protocol have increased in number as well as geographic coverage, and moreover, have become a very ecomonical alternative service for transporting digital data reliably over long distances. Therefore, the present invention contemplates utilizing existing Frame Relay infrastructures to economically interconnect and expand various SS7 facilities.

Unfortunately, using a Frame Relay network to transport SS7 traffic is feasible in theory but inefficient. This is because the SS7 protocol defines user data handling and link managing procedures that continually use all available link bandwidth. For example, in an SS7 protocol communications link "signaling units" are continuously transmitted whether or not message information is actually transferred. Accordingly, running SS7 protocol over a Frame Relay network using a conventional frame relay access device (FRAD) would require a CIR (Committed Information Rate) greater than the standard data rate of an SS7 link (i.e., since SS7 protocol alone would utilize the entire bandwidth, SS7 plus FR would not be possible). Therefore, the present invention contemplates a viable approach: select only the non-redundant and essential SS7 protocol signaling units from an SS7 data stream to transport across the Frame Relay network and subsequently reconstruct the appropriate SS7 protocol data stream at a destination interface. This approach eliminates the need to occupy all the available bandwidth of the Frame Relay network and essentially provides a seamless and economical logical data link between geographically separated SS7 facilities.

In accordance with the present invention, a specially enhanced frame relay access device, the SS7 FRAD, recognizes and eliminates redundant information from an SS7 protocol data stream signal source and encapsulates essential SS7 signaling units into Frame Relay (FR) protocol packets for introduction into a Frame Relay network. The SS7 FRAD also performs the complementary interfacing functions including extracting and decapsulating SS7 data from received FR frames and the generating of a complete and continuous SS7 data stream. Basically, SS7 FRADs are used in pairs. By connecting the FR interface of one SS7 FRAD to the FR interface of a mate SS7 FRAD across a digital data network, a pair of SS7 FRADs can be made to support the operation of a single SS7 link. Moreover, the present invention further contemplates a signaling system arrangement wherein various SS7 facilities (different networks and/or signaling/transfer points) can be interconnected in an economical fashion by exchanging signaling units and other information across an existing Frame Relay network through the use of two or more enhanced FRAD interfaces in accordance with the present invention.

BRIEF DESCRIPTION OF THE DRAWINGS

These and other features and advantages of the present invention will become more completely understood by referring to the following detailed description of presently preferred exemplary embodiments in conjunction with the FIGURES in which like reference numerals refer to like elements throughout.

DETAILED DESCRIPTION OF THE DRAWINGS

In the following description, for purposes of explanation and not limitation, specific details are set forth, such as particular circuits, circuit components, interfaces, techniques, etc. in order to provide a thorough understanding of the present invention. However, it will be apparent to one skilled in the art that the present invention may be practiced in other embodiments that depart from these specific details. In other instances, detailed descriptions of well known methods and programming procedures, devices, and circuits are omitted so not to obscure the description of the present invention with unnecessary detail.

Figure 1:
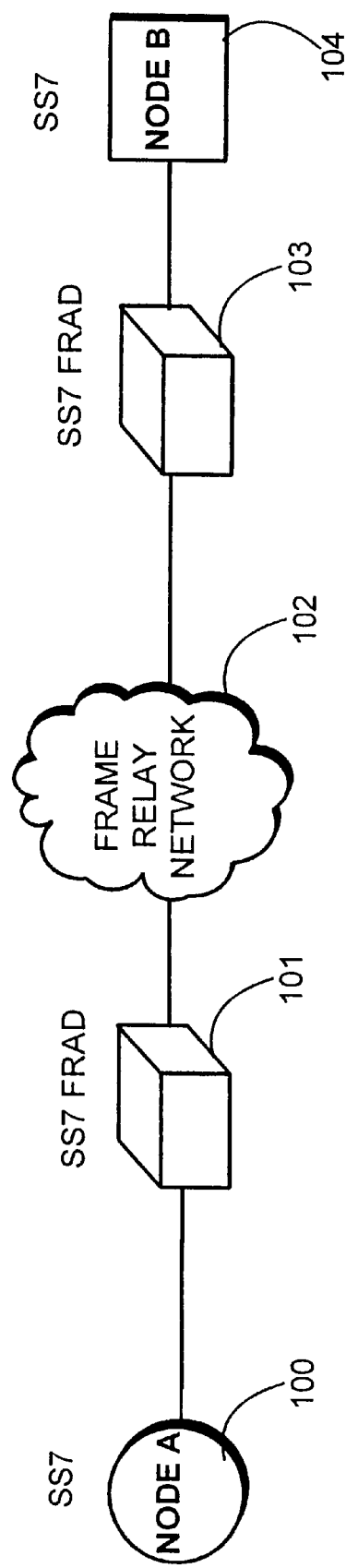
FIG. 1 is a diagrammatic illustration of digital communication link between different SS7 facilities using a pair of FRADs in accordance with the present invention.

FIG. 1 shows a diagrammatic illustration of a single basic communications link across a Frame Relay network between different SS7 facilities using a pair of custom FRADs in accordance with one contemplated example of the present invention. A service switching point (Node A) of a first SS7 facility 100 is provided with a special SS7 frame relay access device (FRAD), 101, which interfaces an SS7 protocol data stream to a Frame Relay network 102. A signaling transfer point (Node B) of a second SS7 facility 104 is also provided with a special SS7 FRAD, 103, for interfacing to Frame Relay network 102. The two SS7 FRAD interfaces, 101 and 103, may be situated anywhere within the Frame Relay network as is most suitable for convenience of connection to a desired SS7 facility.

Figure 2:
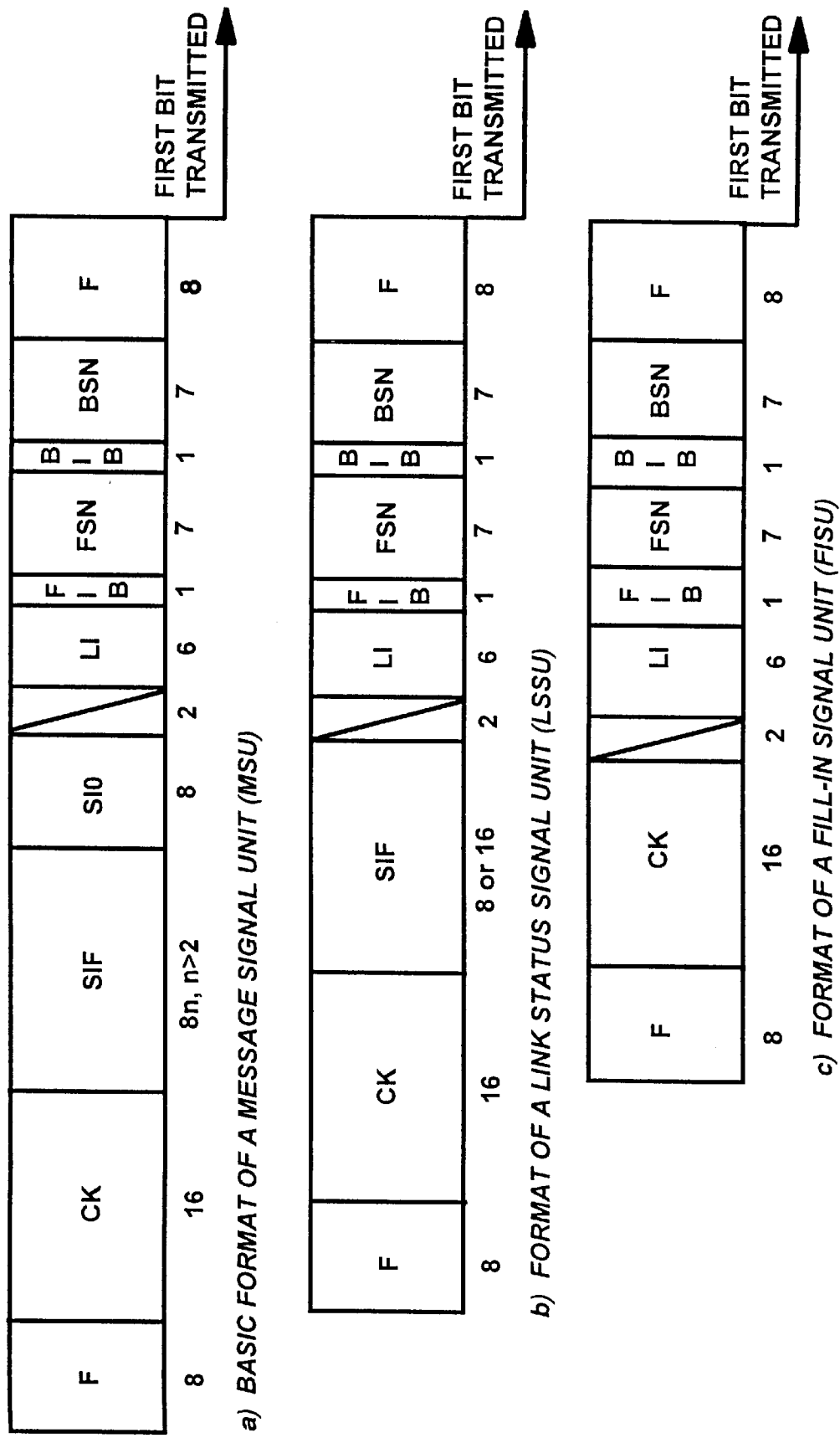
FIG. 2 is an illustration of the format of conventional SS7 protocol signaling units.

Each SS7 FRAD interface accepts a continuous stream of data packets, referred to as "signal units" or "signaling units" (SUs), from the SS7 facility side of the interface. Signaling units basically come in three distinct types: 1) a message signal unit (MSU), 2) a link status signal unit (LSSU), and 3) a fill-in signal unit (FISU). FIG. 2 depicts the conventional internal data format of each of the three types of SS7 protocol signaling units in detail. The table below provides a key to the abbreviations used in FIG. 2.

| FIG. 2 DEFINITIONS | |
| --- | --- |
| BIB | Backward Indicator Bit |
| BSN | Backward sequence number |
| CK | Check Bits |
| F | Flag |
| FIB | Forward Indicator Bit |
| FSN | Forward sequence number |
| LI | Length Indicator |
| SF | Status Field |
| SIF | Signaling Information Field |
| SIO | Service Information Octet |

In accordance with the SS7 protocol, a continuous synchronous stream of signaling units is utilized to maintain a high level of link failure detection. Various signaling units contain essential switching information required to implement desired telco functions or services (e.g., MSUs). However, many of the signaling units transmitted contain redundant information and are used primarily to maintain a continuous indication that the link is functional (e.g., FISUs). Other signaling units are used to provide information relating to the link condition and status of particular signaling points (e.g., LSSUs). Consequently, many of the signaling units transmitted over a period of time serve purposes or convey information which is not essential to convey across a Frame Relay network in order to reconstruct the SS7 data stream at a destination. Thus, it is possible to eliminate a significant number of redundant or unnecessary signaling units from an SS7 data stream and encapsulate only selected essential signaling units in a Frame Relay (FR) protocol frame for transport through the FR network and still be able to reconstruct a viable SS7 data stream at the destination.

Figure 3:
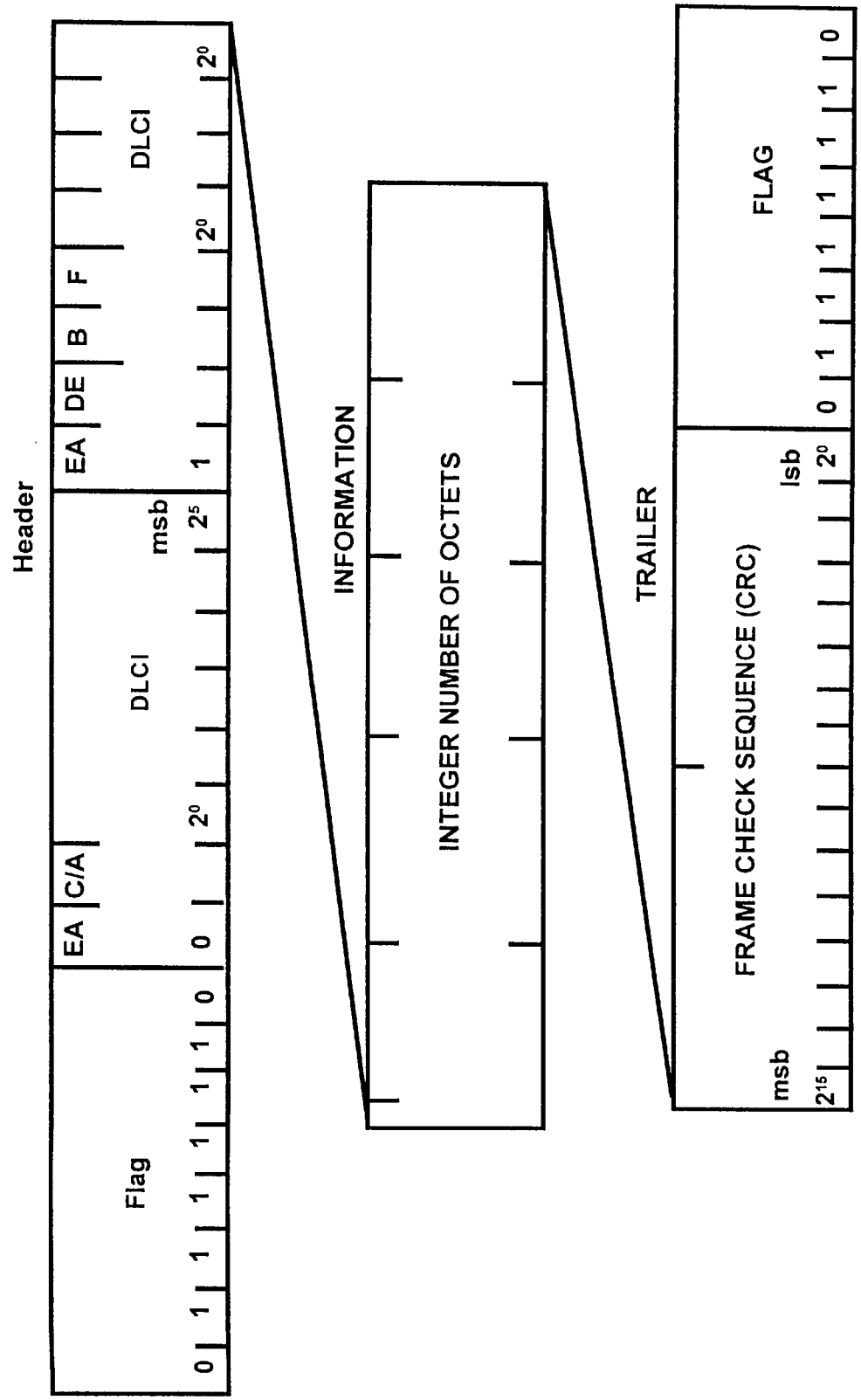
FIG. 3 is an illustration of the format of a conventional frame in a Frame Relay protocol network.

In accordance with the present invention, each SS7 FRAD interface determines which signaling units are essential and which are redundant or unnecessary for reconstruction of the SS7 data stream at a destination FRAD interface elsewhere on the FR network. The FRAD then encapsulates the SS7 signaling units as they occur within an FR frame only if it determines they are essential. FIG. 3 illustrates the general format of a conventional FR frame as generated by the SS7 FRAD to encapsulate and transport the essential signaling units. Basically, each frame includes a "header" portion containing a destination address, an "information" or "payload" portion containing an integer number of octets of information data to be transported, and a trailer portion containing an error check code (CRC). The SS7 signaling units determined as essential at an origin SS7 FRAD interface are encapsulated within the "information" portion of an FR frame and the frame is addressed to the appropriate destination SS7 FRAD interface elsewhere on the FR network.

Figure 4A:
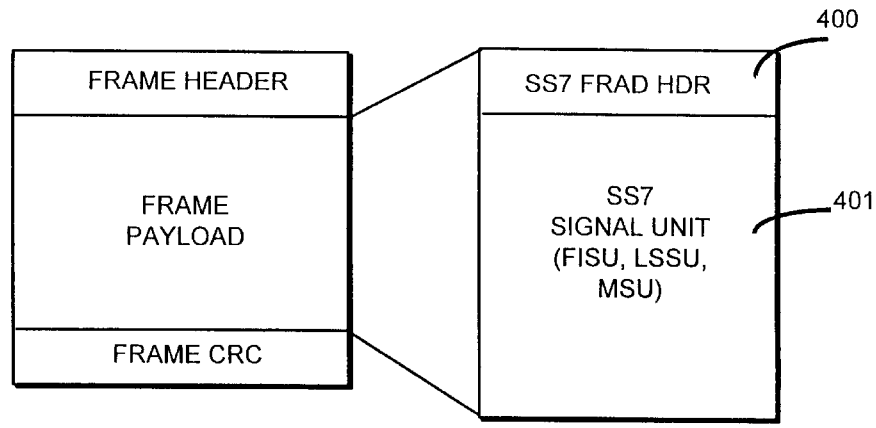
FIGS. 4A, 4B and 4C are block diagrams illustrating the three basic types of information frames produced by the present invention for transmission over a frame relay network.
Figure 4B:
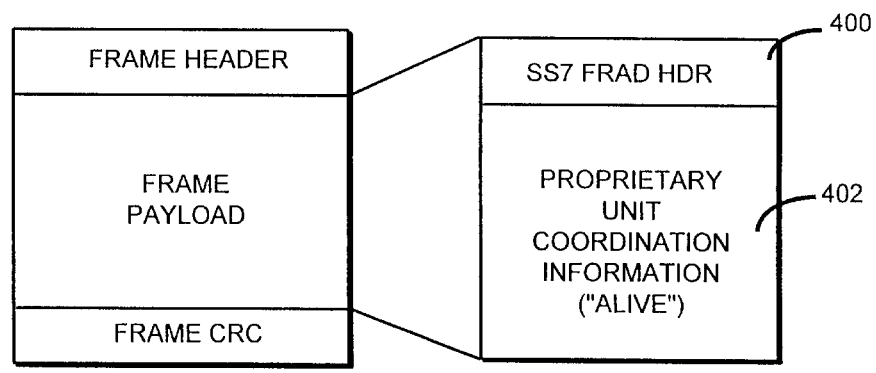
Figure 4C:
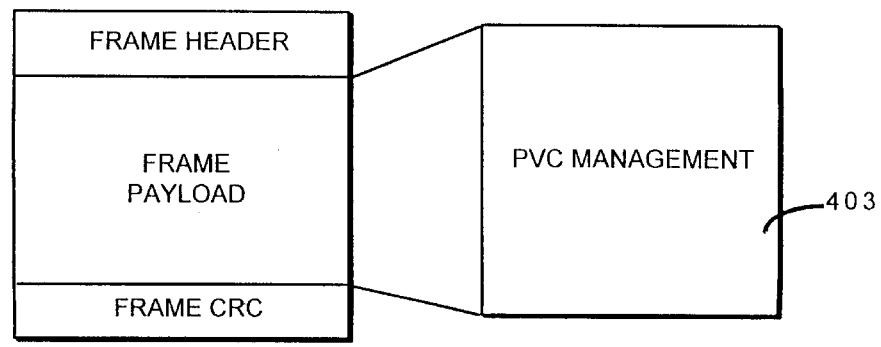

Three distinct types of FR frame formats are produced by the SS7 FRADs of the present invention. The first frame type, illustrated in FIG. 4A, is used to encapsulate an essential SS7 signaling unit. It consists of an SS7 FRAD header section 400, that contains within the frame payload both processing information specific to a particular SS7 FRAD and an encapsulated SS7 signaling unit section 401. The second type of frame, as illustrated in FIG. 4B, contains an SS7 FRAD header section 400 and a proprietary section, 402, within the frame payload. Since the SS7 FRAD interface can not provide encapsulated SS7 signaling units unless it is receiving signaling units to send, proprietary section 402 provides coordination information that is exchanged between mated active or "alive" SS7 FRADs on an FR network to indicate the operational status of each. In the event an associated SS7 facility fails or the SS7 network is down, "alive" frames are sent every approximately 500 ms, assuming no signaling units are received by the SS7 FRAD from the associated SS7 facility within that time period. An exchange of proprietary "alive" frames between mated SS7 FRADS in this manner provides an indication to each SS7 FRAD interface that a particular SS7 FRAD to SS7 FRAD link over the Frame Relay network is still operational. The third type of frame, as illustrated in FIG. 4C, is used to conduct PVC (private virtual circuit) management as defined by the ITU-TS or ANSI Frame Relay protocol standard.

Figure 5A:
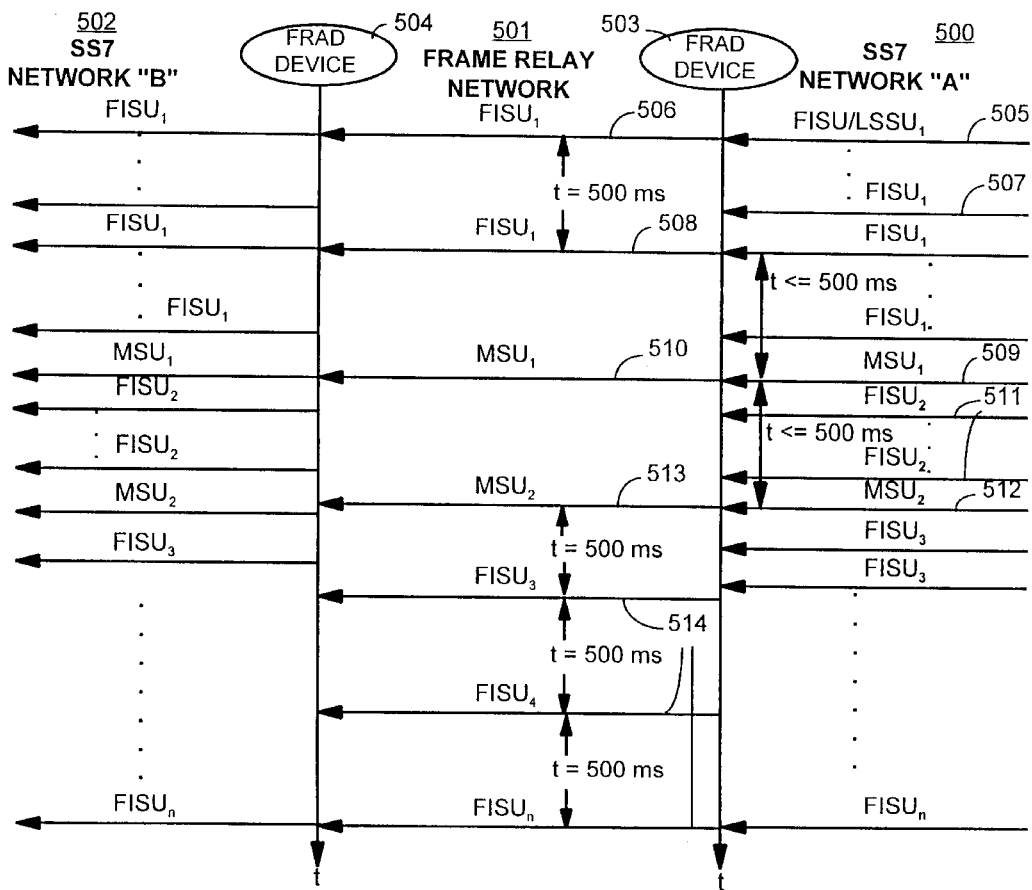
FIG. 5A and 5B are diagrams illustrating signaling unit timing and flow between two SS7 FRADs across a frame relay network in accordance with the present invention.
Figure 5B:
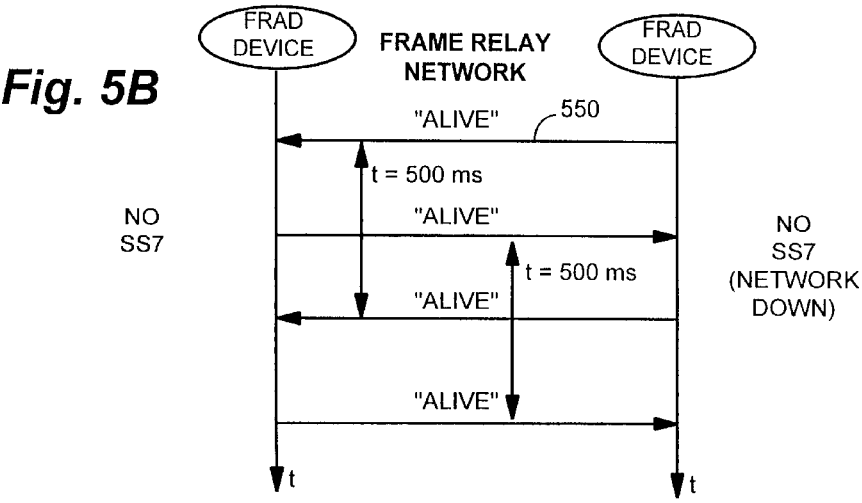

Referring now to FIGS. 5A and 5B, an example of the timing and flow of SS7 signaling units across a Frame Relay network for a SS7 FRAD link in accordance with the present invention is explained. FIG. 5A illustrates an example sequence (in one direction only) of incoming and outgoing SS7 signaling units and FR (Frame Relay) frames that might transpire between two SS7 FRADs, 503 and 504, during a communication from SS7 network "A" (500) to SS7 network "B" (502). The SDL process specification shown in FIGS. 10A and 10B describes the internal operation of the SS7 FRAD that causes the signal unit timing and flow described in this example. In accordance with the present invention, SS7 FRAD 503 sends a frame to SS7 FRAD 504 at least every 500 ms or less. As SS7 FRAD 503 receives FISU and LSSU signaling units 505 from network "A", it encapsulates the FISU or LSSU into an FR frame 506 with a DLCI (data link connection identifier) of the PVC (permanent virtual circuit) between FRADs 503 and 504, and forwards the frame over FR network 501 to SS7 FRAD 504. Subsequent FISUs and LSSUs 507 are excluded if they contain redundant information.

An identical encapsulated FISU/LSSU 508, albeit redundant, is forwarded over the FR network after 500 ms if no new (non-redundant) SS7 signaling units are received from SS7 facility 500. If during any 500 ms period an SS7 MSU (message signaling unit) is received, for example MSUs 509 and 512, or a non-redundant FISU/LSSU is received, it is immediately encapsulated in a frame (510 and 513) and forwarded on the FR network. FISUs received immediately following an MSU, for example FISUs 511, usually contain only unnecessary or redundant information and are not forwarded until the expiration of a 500 ms period following the forwarding of that MSU. In contrast, an LSSU following an MSU usually represents a link status change and must be forwarded over the FR network. In the absence of an MSU, an updated FISU or an LSSU (514), as appropriate, is encapsulated and forwarded at least once every 500 ms. At destination SS7 FRAD 504, FISUs and LSSUs are generated from received frame payload information as needed to sustain a proper SS7 protocol data stream on the SS7 network side of that interface.

FIG. 5B illustrates the exchange of proprietary "alive" frames between SS7 FRADs. If no signaling units are received by an SS7 FRAD (for example the connection to the SS7 network portion is down or the SS7 network facility is inoperative), the affected SS7 FRAD will forward a proprietary "alive" message 550 within an FR frame payload to other SS7 FRADs on the FR network at least once every 500 ms to indicate that it is functioning. Current SS7 network status and other device related information may be exchanged between facilities in this manner.

Figure 6:
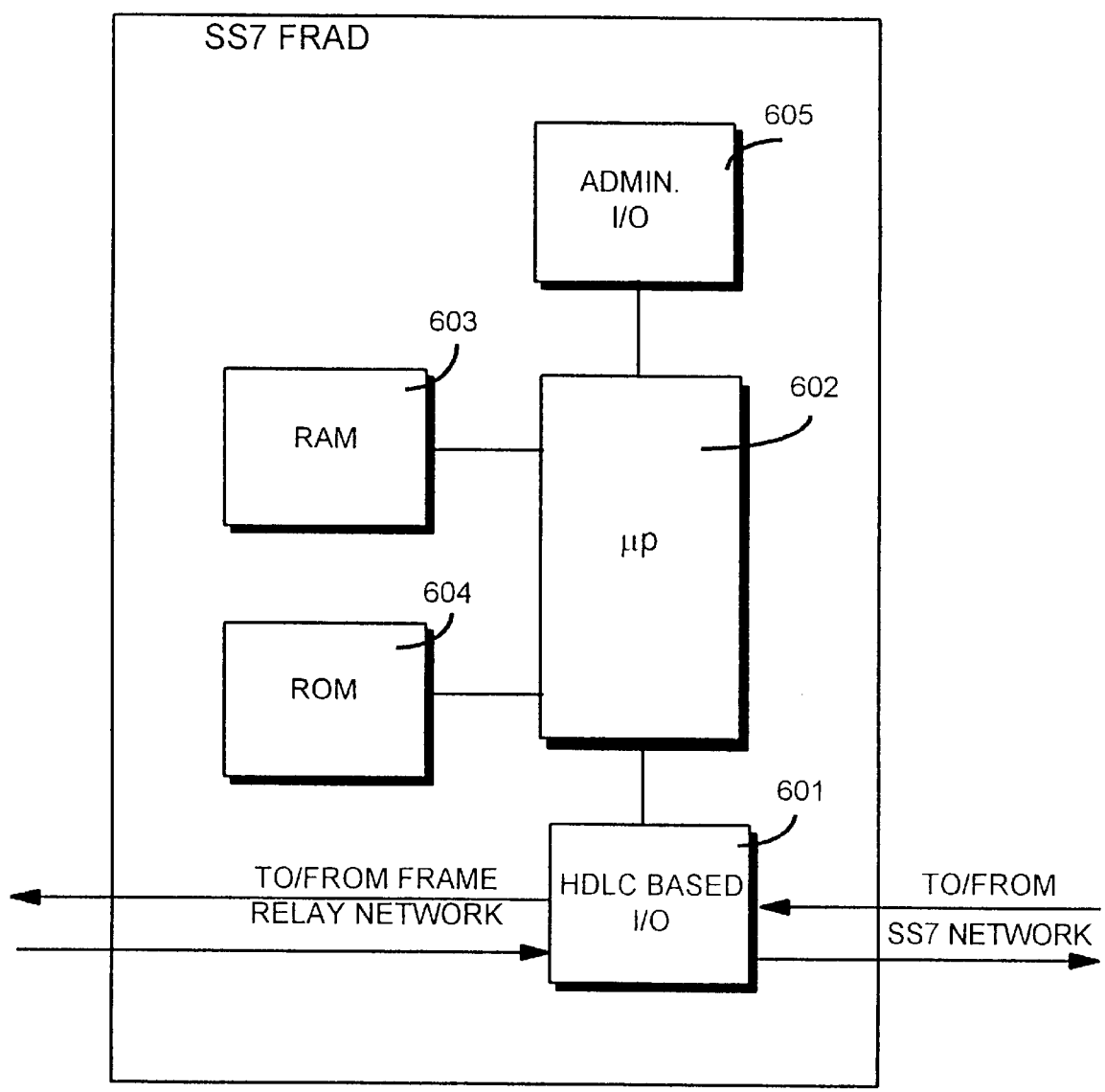
FIG. 6 is a schematic block diagram showing the hardware architecture for an SS7 FRAD frame relay access device in accordance with the present invention.

FIG. 6 illustrates the basic architecture of internal hardware for an SS7 FRAD in accordance the present invention. HDLC based module 601 receives and transmits formatted data packets in response to microprocessor controller 602. Microprocessor controller 602 controls data formatting operations of HDLC based interface module 601 in accordance with inputted and preprogramed instructions stored in RAM 603 and ROM 604. An administrative I/O interface 605 provides for user command input, device status reporting and programing.

Figure 7:
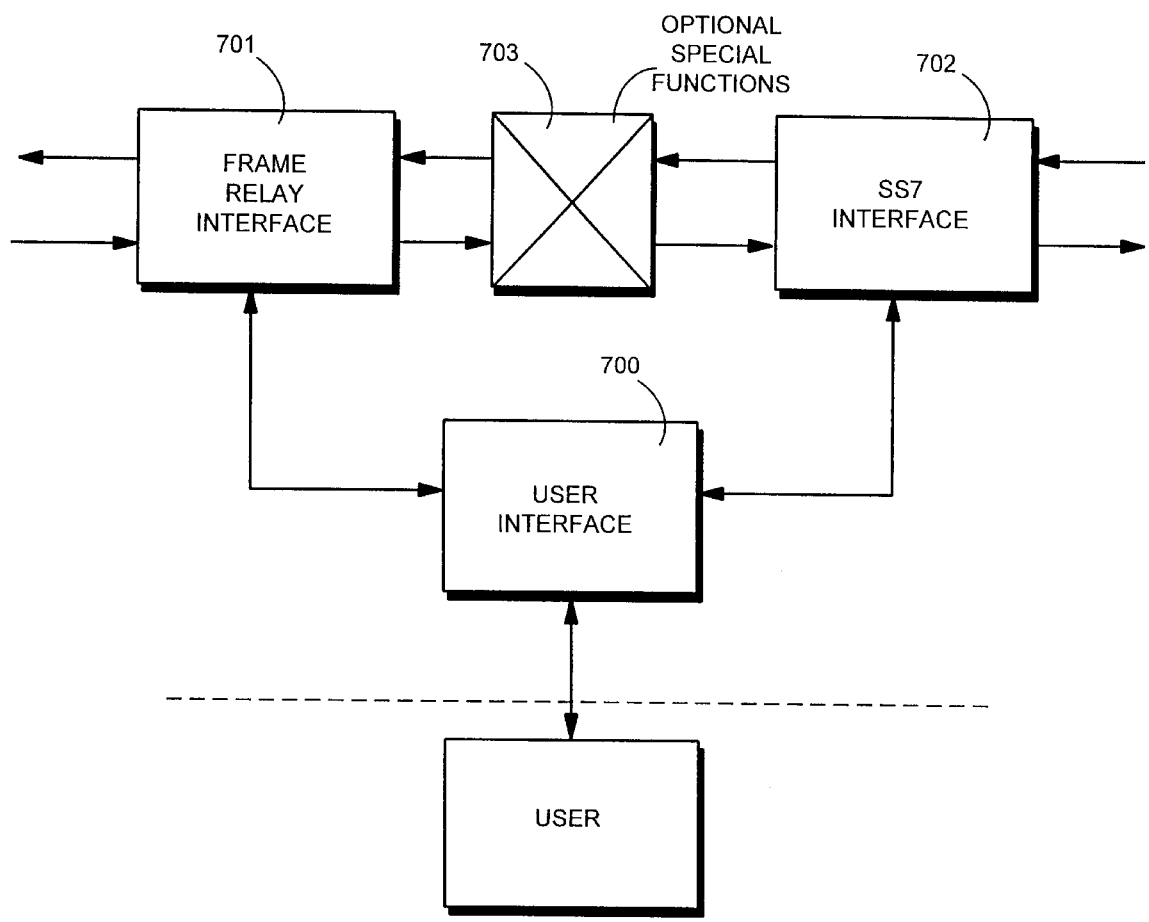
FIG. 7 is a block diagram which illustrates basic operations performed by an SS7 FRAD in accordance with the present invention.

FIG. 7 illustrates basic functions processes performed by the SS7 FRAD hardware and software in accordance with the present invention. Each SS7 FRAD includes a user I/O interface 700, a Frame Relay network interface 701, an SS7 network interface 702 and optional special functions 703. Frame Relay network interface 701 encapsulates SS7 signaling unit data in FR frames, extracts SS7 signaling units from received FR frames and provides a compatible FR network connection. SS7 interface 702 distinguishes redundant from essential SS7 signaling units, generates a continuous SS7 output data stream and provides a compatible connection to SS7 facilities. Optional special functions 703, such as encryption/decryption and data compression/decompression, also can be incorporated in each SS7 FRAD to tailor it to the requirements of a particular application.

The remaining FIGS. 8 through 13 depict Specification Description Language (SDL) representations for the stored program control software of the SS7 FRAD. These SDL representations are exemplary of the state machine behavior created by control software stored in the SS7 FRAD and may be used by a programmer of ordinary skill in the art to generate an appropriate control program in accordance with the present invention without undue experimentation. Beginning with FIG. 8, an SDL system specification diagram, 800, depicting the five primary functions of the SS7 FRAD is first briefly discussed. Large arrows 801, 802, 803 and 804 indicate data from Frame Relay network and SS7 network facilities entering and leaving the SS7 FRAD. Arrow lines 805, 806, 807 and 808 indicate the direction of communications exchanged between functional blocks 810, 820, 830, 840 and 850. The bracketed terms associated with each arrow line indicate the types of messages exchanged between functional blocks. There is no state information per se at this level of abstraction. Instead, each of functional block 810, 820, 830, 840 and 850 is described in greater detail in conjunction with the individual detailed SDL process specification diagrams of FIGS. 9 through 13.

Figure 8:
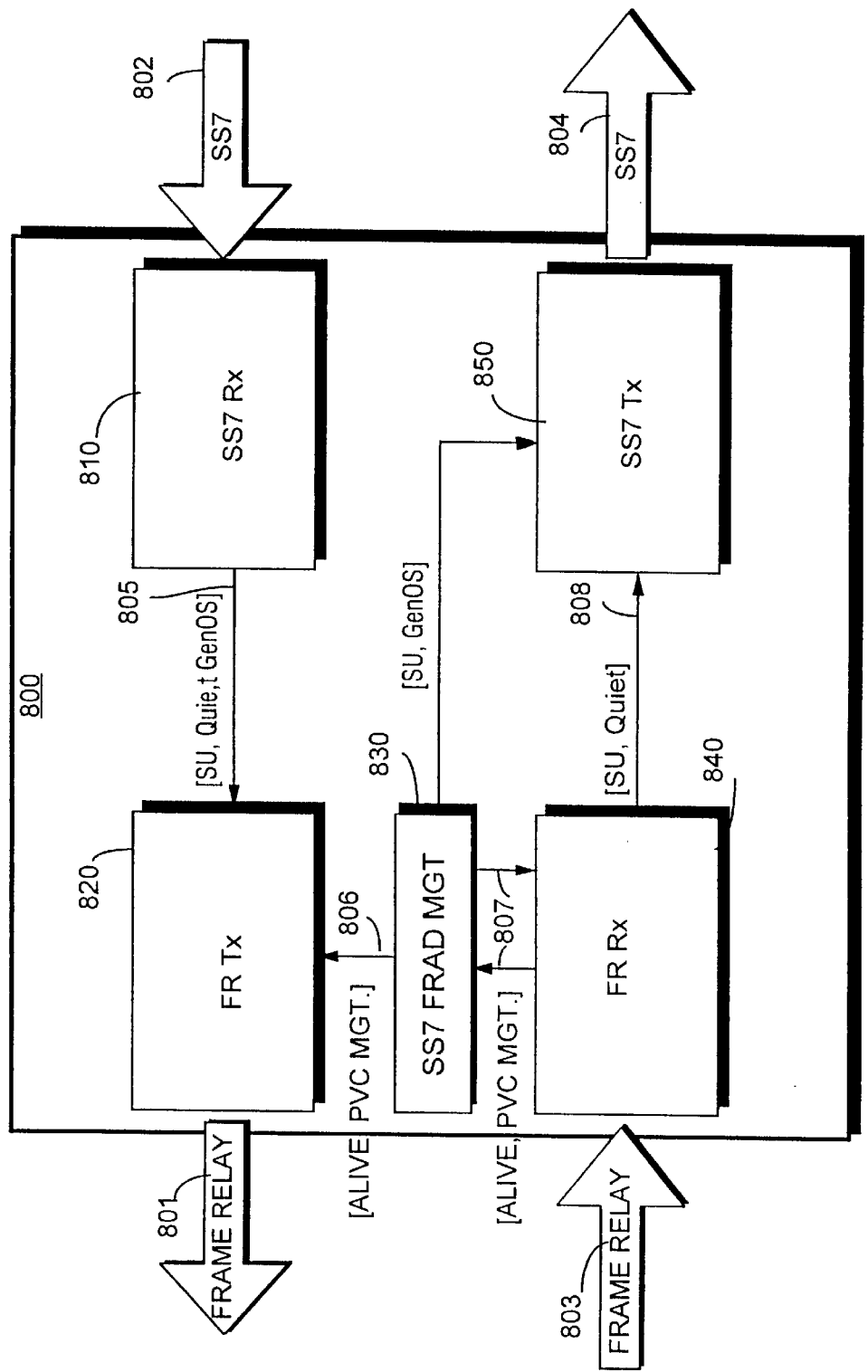
FIG. 8 is a high level Specification Description Language (SDL) (e.g., in accordance with ITU-T Recommendations No. Z. 100) system specification representation of the primary functional modules of the SS7 FRAD in accordance with the present invention.

Referring now to FIG. 8, the primary operations of the SS7 FRAD are shown and basically consist of: 1) receiving a full bandwidth serial data stream 802 from the SS7 network and removing most of the redundant SS7 signal units from the received stream, as represented by SS7 Rx functional block 810; 2) providing a reduced set of signal units 805 to Frame Relay network 801, as represented by FR Tx functional block 820; 3) receiving frames from Frame Relay network 803 and removing encapsulated SS7 signal units from the frames, as represented by FR Rx functional block 840; 4) sending decapsulated signal units 808 to the SS7 network 804, as represented by SS7 Tx functional block 850; and 5) managing the SS7 FRAD communications, as represented by SS7 FRAD MGT functional block 840. The management of SS7 FRAD communications primarily entails handling fault conditions through the exchange of "alive" status messages between SS7 FRAD pairs and FRAD-to-FRAD coordination of operational data by an exchange of PVC information between FRAD pairs. SS7 Signal Units (SU) and general SS7 FRAD system messages (GenOS) are also exchanged internally between functional sections as indicated by lines 805 and 808. Likewise, PVC management information and "Alive" messages are passed internally between the FR Tx and FR Rx controllers as indicated by lines 807 and 806. Other more or less conventional functions, such as FRAD-to-user communications, are included but not shown in FIG. 8 because such functions do not significantly influence the behavioral state of the FRAD device and, moreover, the implementation of such functions is generally familiar to those of ordinary skill in the art of digital data communications equipment design.

Figure 9:
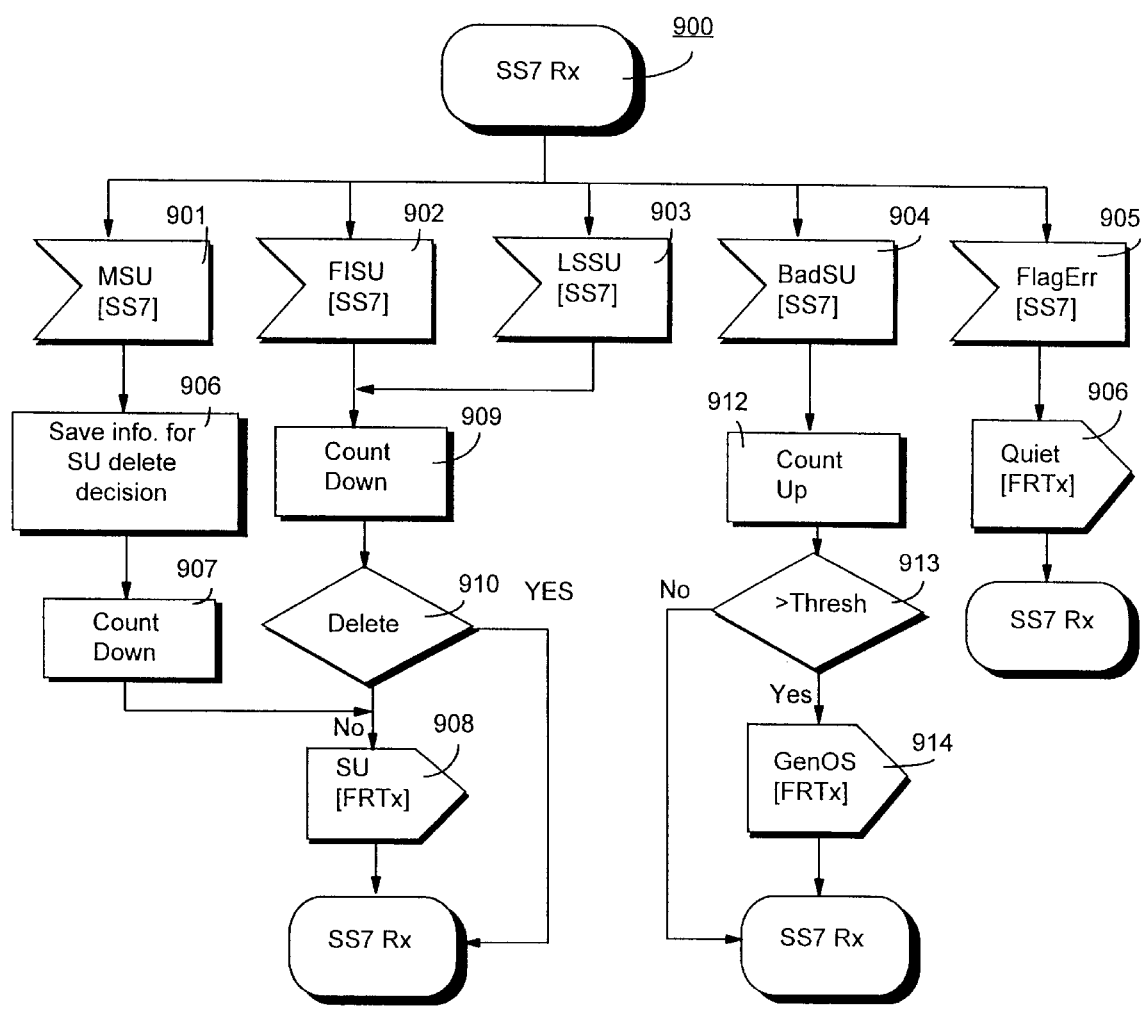
FIG. 9 is an SDL process specification diagram of the SS7 interface receive functions for the SS7 FRAD in accordance with the present invention.

Referring next to FIG. 9, an SDL process specification representation for the SS7 Rx interface of an SS7 FRAD in accordance with the present invention is now discussed. Bracketed terms within the function blocks indicate input sources or output destinations for data or messages.

Figure 11:
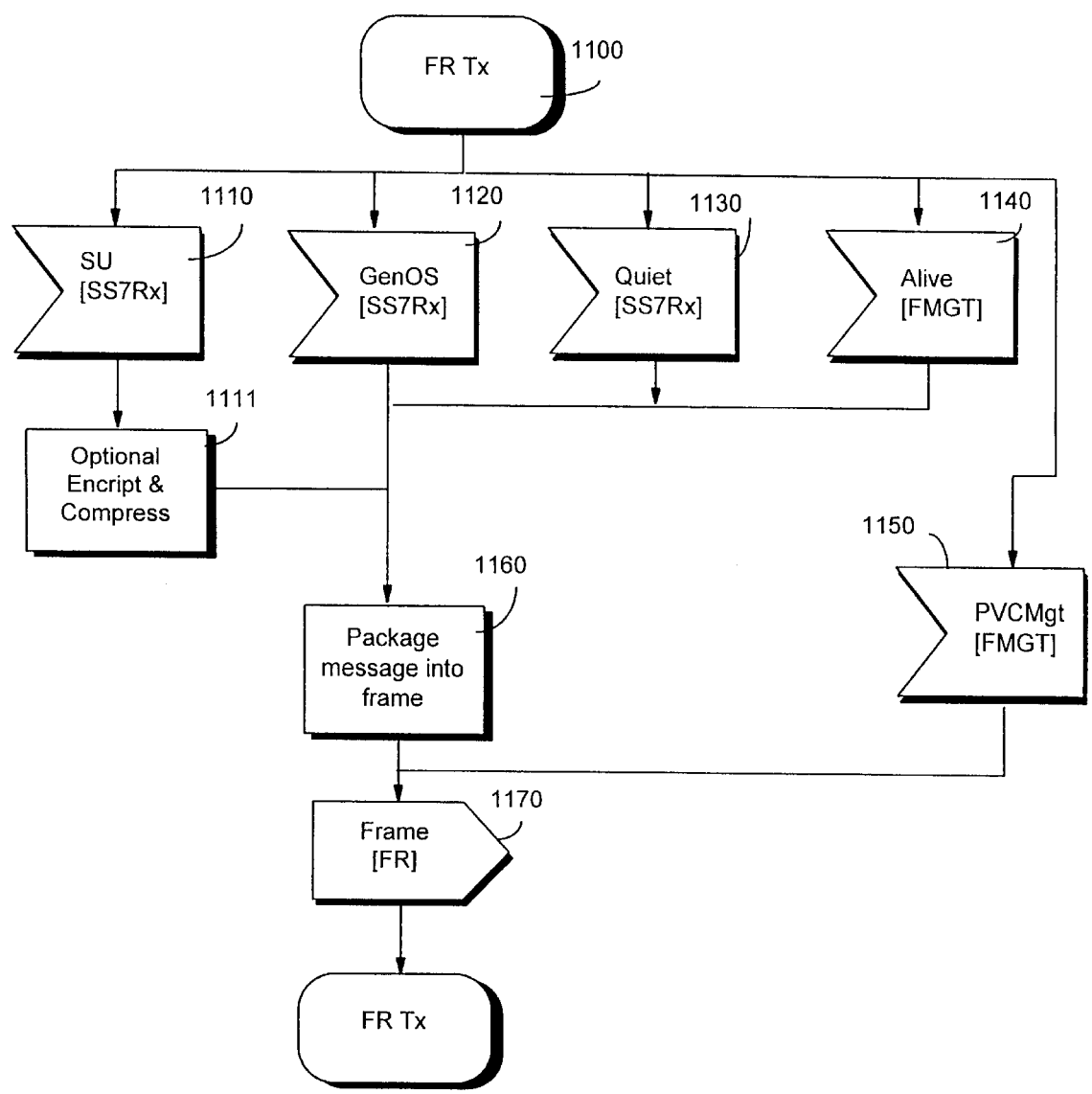
FIG. 11 is an SDL process specification diagram of the Frame Relay interface transmit functions for the SS7 FRAD in accordance with the present invention.

Basically, a state machine representation of the SS7 Rx interface (900) has only a single state that is driven by five external inputs represented in blocks 901 through 905. These five inputs comprise SS7 data stream message signal units (MSU) 901, fill-in signal units (FISU) 902, link status signal units (LSSU), bad (faulty) signal units (904) and Flag Errors (905), all of which are obtained from the input SS7 network data stream. An MSU received from the SS7 input data stream causes an information save action 906 and a counter decrement action 907 followed by a transfer of the MSU, indicated at block 908, to the Frame Relay Transmit control software, i.e., FR Tx state machine (FIG. 11). FISU and LSSU inputs, 902 and 903, cause a counter decrement action 909 followed by a decision process 910 where the FISU/LSSU is either deleted from the serial data stream or allowed to pass. This decision process reduces duplicate signal units over a finite and programmable period of time. Accordingly, the decision process at block 910 must also maintain information on elapsed time in addition to recognizing redundant signal units. Moreover, in accordance with the present invention, it is prudent to allow a slight flow of duplicate FISU/LSSU traffic as a means to keep data synchronization between the two mate SS7 FRADs.

If a "bad" (i.e., incomplete or faulty) signal unit is received, as indicated at input block 904, a counter is incremented, block 912, and then the count is tested, block 913, against a preset threshold value. If the threshold value is exceeded then a GenOS (general operating system) message, block 914, is passed to the Frame Relay Transmit control section (see FR Tx state machine representation 820 in FIG. 11). Sending a GenOS to the FR Tx control software results in the transmitting of SIOS (status indicator out of service) LSSUs to the far end SS7 entity/facility. This action simulates the "level 2" Signal Unit Error Rate Monitor (SUERM) normally found in the SS7 protocol handler in an SS7 entity. In accordance with the present invention, the SS7 FRAD utilizes a SUERM simulator with an ability to generate SIOS LSSUs because it is neither economically prudent nor technically feasible to send flawed signal units through the Frame Relay network at a rate that is sufficient to trigger the SUERM in the far end SS7 entity.

If the SS7 Rx control section (810) receives too many flags between signal units from an incoming SS7 data stream or it does not receive enough flags and signal units over a period of time, a "FlagErr" is produced, block 905. A "Quiet" message, block 906, is then provided to the FR Tx control section (820) for informing the far end SS7 FRAD of SS7 link discontinuity.

Figure 10A:
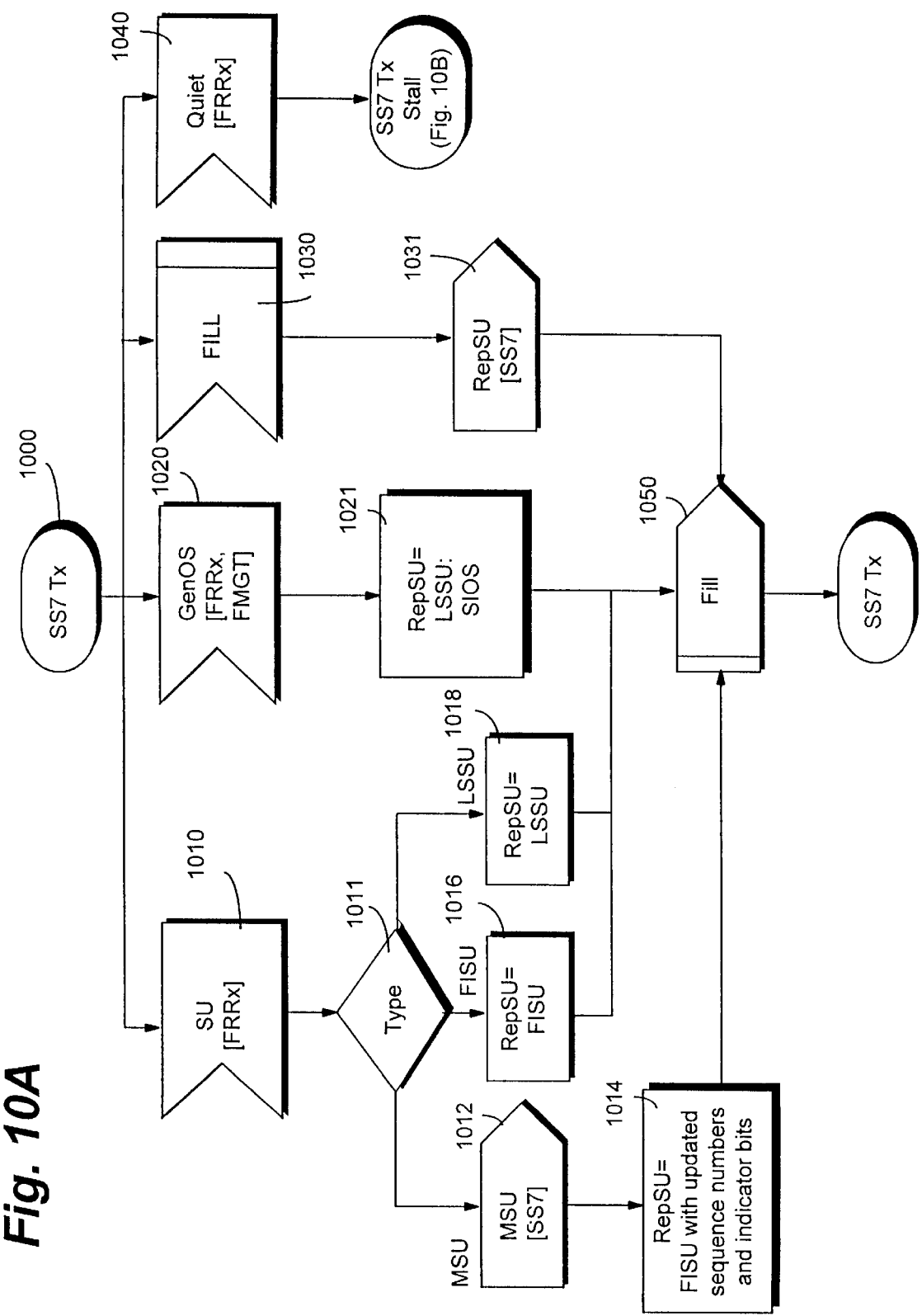
FIGS. 10A and 10B are SDL process specification diagrams of the SS7 interface transmit functions for the SS7 FRAD in accordance with the present invention.
Figure 10B:
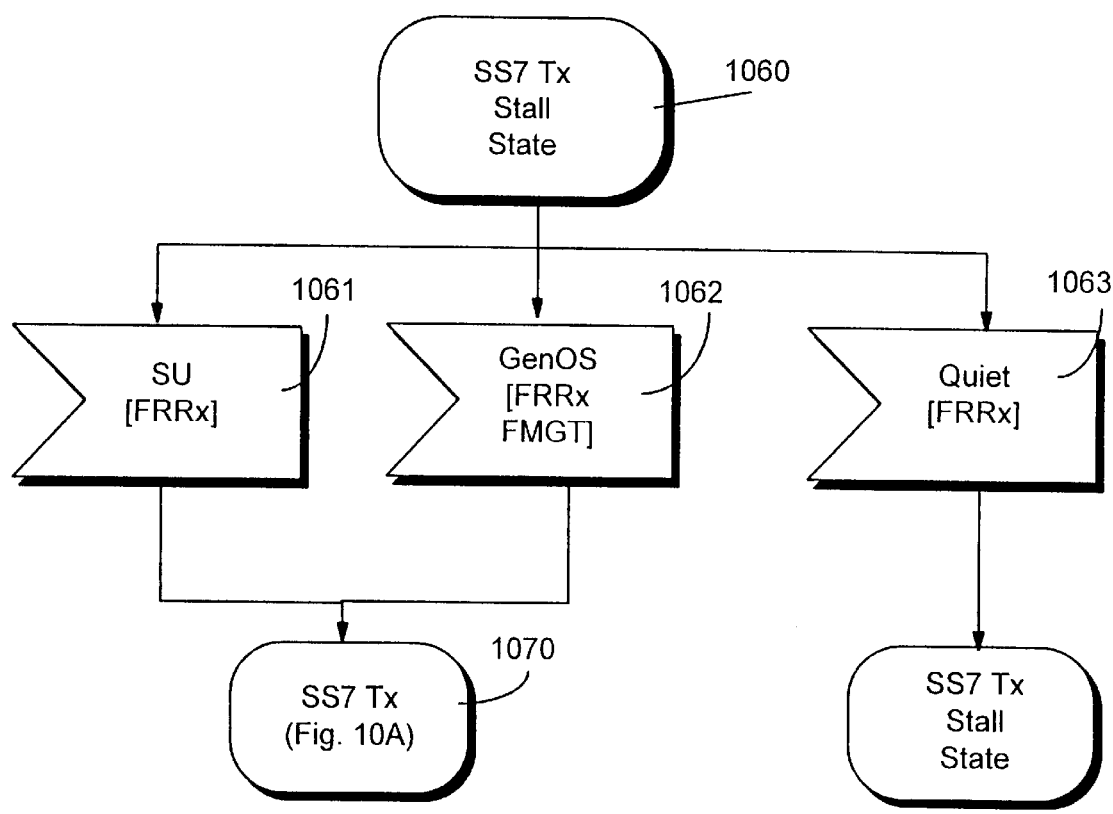

Referring now to FIGS. 10A and 10B, an SDL process specification representation for the SS7 Tx interface of an SS7 FRAD in accordance with the present invention is described. The SS7 Tx function state machine representation has two basic states: 1) the SS7 Tx state (depicted in FIG. 10A); and 2) the SS7 Tx Stall state (depicted in FIG. 10B). The SS7 Tx state, as shown in FIG. 10A, is driven by three external inputs and one internal input: SU (SS7 signal units) 1010, GenOS messages 1020, "Quiet" commands 1040 (external) and "Fill" commands 1030 (internal). As indicated in brackets, the sources of external inputs 1010, 1020 and 1030 are the FR Rx (840) and the SS7 FRAD management control functions (830).

Encapsulated SS7 signal units received from the Frame Relay network are decapsulated by the FR Rx control function (discussed below) and provided to the SS7 Tx interface control function (850), as represented by SU input block 1010. The receipt of a decapsulated SS7 signal unit triggers a decision process 1011 to determine the particular type of signal unit message received. If the signal unit is an MSU, the signal unit is placed directly on the SS7 network, as indicated at output block 1012. This is followed by the production of an RepSU, as indicated at block 1014. An RepSU is a duplicated SS7 signal unit and can take several forms. In this instance, the RepSU is generated as an FISU with sequence numbers and indicator bits set to the same values as that of the presently received MSU. Next, at block 1050, an internal Fill command is generated which forces the SS7 Tx function to continue sending the RepSu on the SS7 network so as to properly generate and "fill" the outgoing SS7 data stream in accordance with SS7 protocol. If the signal unit received from the FR Rx section is an FISU or an LSSU an RepSU is generated that is the same as the incoming signal unit, as indicated by decision process output blocks 1016 and 1018, and then the Fill command is generated as before.

If the SS7 Tx interface control section receives a GenOS message from the FR Rx section or the FRAD management section (FMGT), as indicated at input block 1020, an RepSU is generated, block 1021, that is equivalent to an LSSU with an Out of Service link status indicator (SIOS), and then the Fill command is generated. When the internal Fill command is processed, block 1030, it causes a sending of the current RepSU to the SS7 network, block 1031, and then another Fill command is generated, at block 1050, which continues the cycle to completely fill the SS7 data stream with signal units according to protocol. If a "Quiet" command is received by the SS7 Tx interface, as indicated in block 1040, then the interface enters the SS7 Tx Stall state depicted in FIG. 10B.

Referring now to FIG. 10B, the SS7 Stall state is shown driven by three external inputs: SU inputs 1061, GenOS messages 1062, and "Quiet" commands 1063. As indicated in brackets, the source of inputs 1061, 1062 and 1063 is the FMGT function (830) and FR control function (840). In the SS7 Tx Stall state, no output SS7 signal units are generated and no output SS7 data stream is provided to the SS7 network. The effect is that the SS7 transmit side of the SS7 FRAD link becomes silent. The SS7 Tx Stall state is only initiated by receipt of a "Quiet" command from the FR Rx function upon detection of a flag error condition. The SS7 Tx will remain in this stall state until an SU or a GenOS is received from the FR Rx or FMGT, blocks 1061 and 1062, which causes the interface to return to the SS7 Tx state of FIG. 10A, as indicated in block 1070.

Referring now to FIG. 11, an SDL process specification representation for the Frame Relay transmit function (FR Tx) of the SS7 FRAD in accordance with the present invention is discussed. The FR Tx function state machine representation has one state that is driven by five external inputs represented in blocks 1110, 1120, 1130, 1140 and 1150. These five inputs comprise: SS7 signal units (SU) 1110, GenOS messages 1120, "Quiet" commands 1130, "Alive" messages 1140 and PVC management messages (PVCMgt) 1150. As indicated in brackets, sources of inputs 1110, 1120, 1130, 1140 and 1150 are the SS7 Rx function (810) and the SS7 FRAD Management control function (830). An SU input 1110 causes an SS7 signal unit delivered by the SS7 Rx function to be optionally encrypted and compressed, block 1111, then encapsulated in a frame relay frame, block 1160, and transmitted to the Frame Relay network, as indicated by output block 1170. A GenOS message 1120, a "Quiet" command 1130 or an "Alive" message 1140 causes the delivered signal unit to be encapsulated into a frame relay frame, block 1160, and then transmitted on the Frame Relay network. A PVCMgt message input 1150 is simply delivered directly to the Frame Relay network since it is originally generated by the SS7 FRAD Management function as a FR frame.

Figure 12:
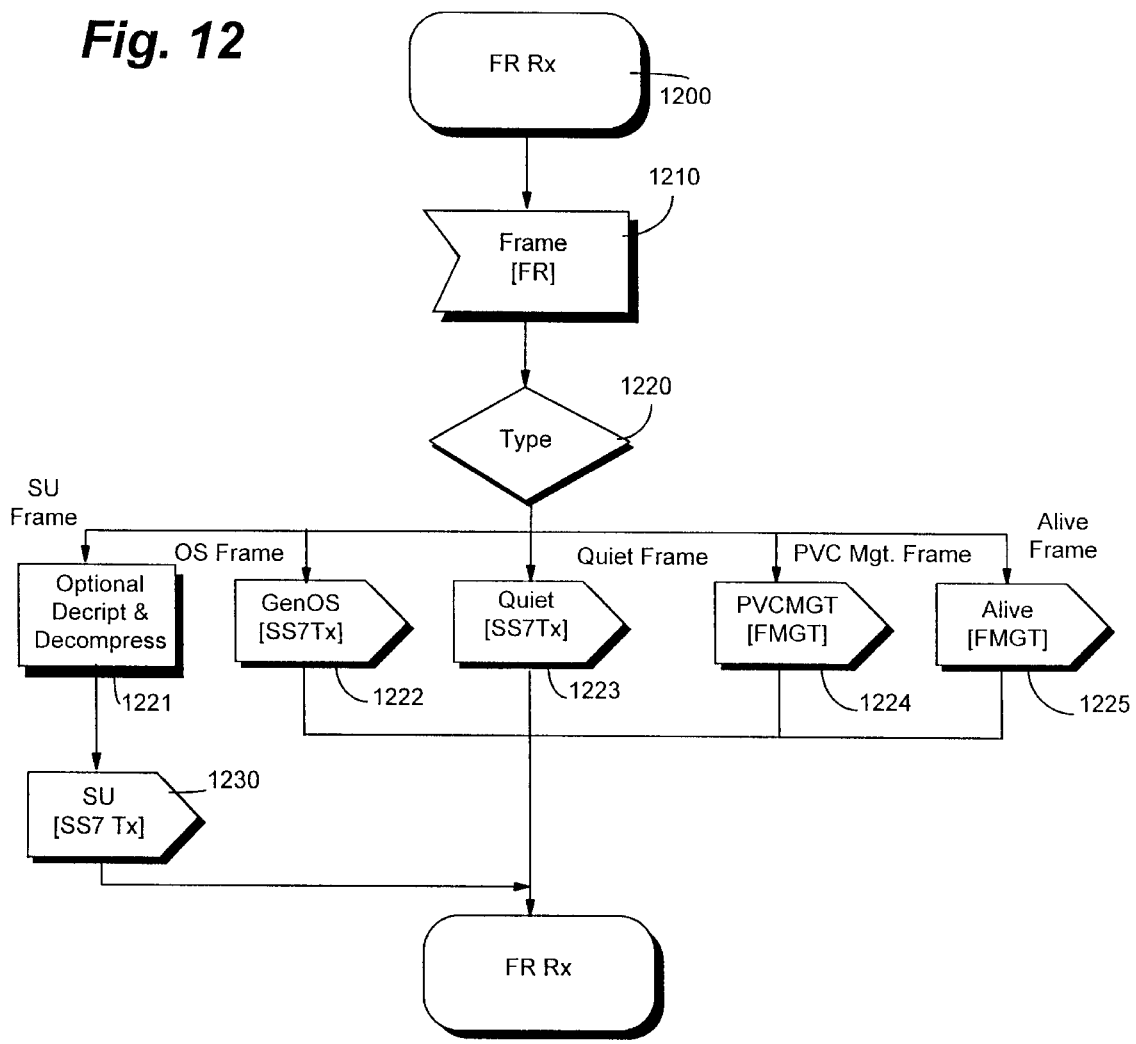
FIG. 12 is an SDL process specification diagram of the Frame Relay interface receive functions for the SS7 FRAD in accordance with the present invention.

Referring next to FIG. 12, the SDL process specification representation for the Frame Relay receive function (FR Rx) of the SS7 FRAD in accordance with the present invention is discussed. The FR Rx function state machine representation has only one state that is driven by a single external input, represented by block 1210, consisting of five types of FR frames received from the Frame Relay network. A received FR frame initiates a decision process, block 1220, that determines the type of incoming frame. If the received frame contains an SS7 signal unit (SU), the SU is decapsulated, optionally decrypted and decompressed as indicated by block 1221, and then sent to the SS7 Tx function control (850) as represented by output block 1230. If the received frame is determined to contain a "Quiet" message or a GenOS message, then the message is forwarded to the SS7 Tx function control, as represented by output blocks 1222 and 1223. If the received frame is determined to contain to a PVCMgt (Private Virtual Circuit, management) or an "Alive" message, then the message is forwarded to the SS7 FRAD Management function control (830) as represented by output blocks 1224 and 1225.

Figure 13:
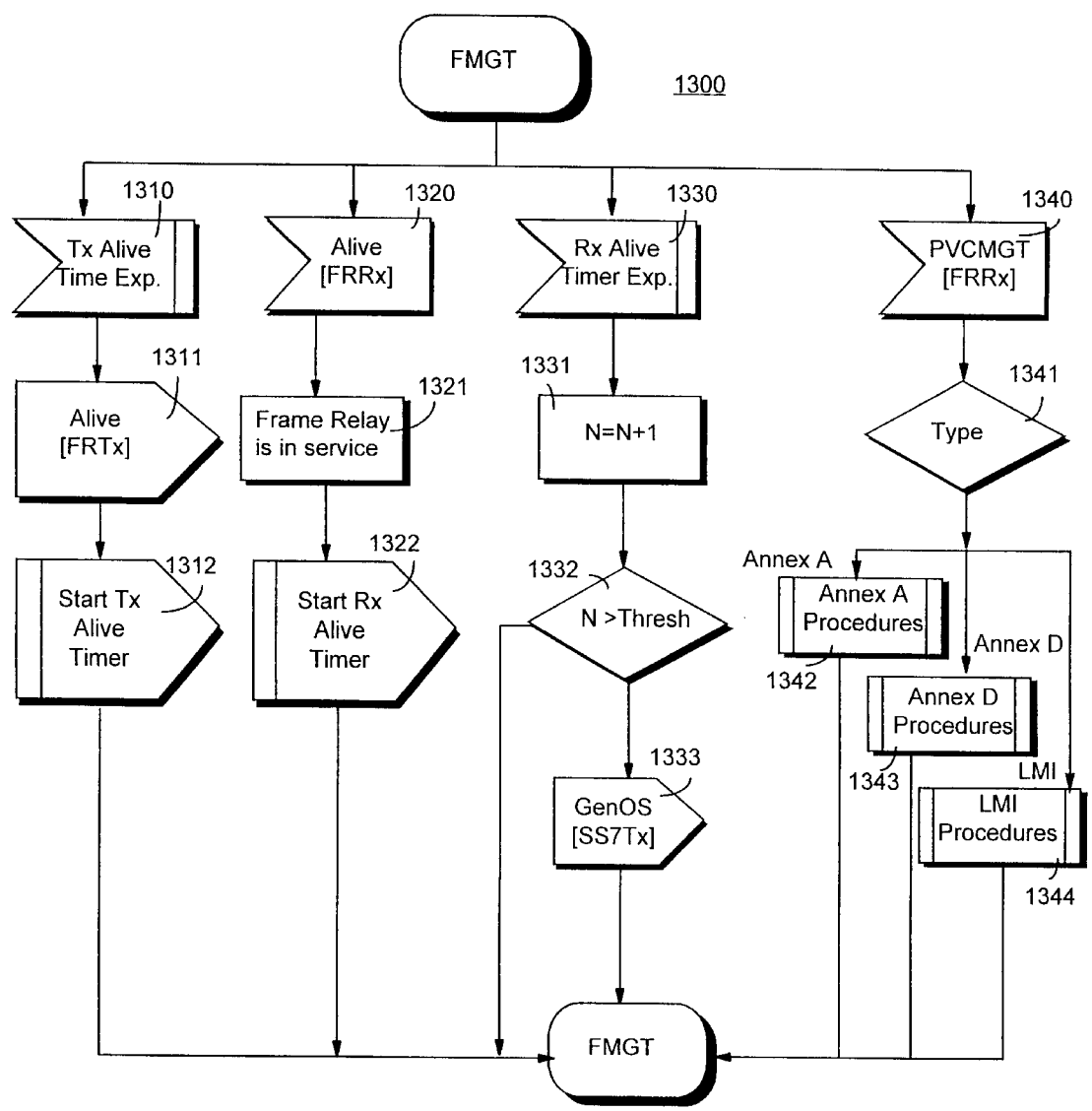
FIG. 13 is an SDL process specification diagram of the management functions for the SS7 FRAD in accordance with the present invention.

Referring now to FIG. 13, the SDL process specification representation for the SS7 FRAD Management function (FMGT) of the SS7 FRAD in accordance with the present invention is discussed. The FMGT function state machine representation has only one state that is driven by two external inputs, represented by blocks 1320 and 1340, and two internal inputs, represented by blocks 1310 and 1330. These four inputs comprise: Tx "Alive" Timer Expired interrupt 1310, "Alive" messages 1320, Rx "Alive" Timer Expired interrupt 1330 and PVCMgt messages 1340. As indicated in brackets, the source of the two external inputs is the FR Rx control function (840). The Tx "Alive" Timer Expired input 1310 and the Rx "Alive" Timer Expired input 1330 are generated internally by the FMGT function. A Tx "Alive" Timer Expired input 1310 causes an "Alive" message to be sent to the FR Tx control function, as indicated at block 1311, then an internal counter/timer is restarted (reset), as indicated by block 1312. The Rx "Alive" Timer Expired input 1330 causes a timer expiry counter to increment, block 1331, and then the expiry counter value is checked against a preset threshold value, as shown at block 1332. If the counter value is greater than the threshold value, a GenOS message is sent to the SS7 Tx control function to force the local SS7 link into an "Out of Service" condition.

If an "Alive" message is received from the FR Rx control function, block 1320, it initiates a "Frame Relay in service" action, block 1321, which serves to provide current status information regarding the working condition of the SS7 FRAD-to-SS7 FRAD link. Next, an internal Rx "Alive" timer counter is reset and restarted, as indicated by block 1322. On the other hand, if a PVCMgt message is received from the FR Rx control function, e.g., block 1340, it initiates a decision process, block 1341, which determines from configuration information stored in the SS7 FRAD itself which of three types of conventional PVC management procedures to implement. As indicated at blocks 1342, 1343 and 1344, depending on the type of message received, either an "Annex A", "Annex D" or an LMI management handler is called.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for transporting system No. 7 (SS7) signaling units and link management information between SS7 network elements, comprising steps of:

(a) receiving an SS7 synchronous data stream from an SS7 network element;

(b) distinguishing essential SS7 signaling units from redundant signaling units within the received SS7 data stream;

(c) ignoring said redundant data signaling units and encapsulating essential data signaling units in frame packet form consistent with conventional frame relay network protocol; and (d) introducing frames of encapsulated data signaling units from step (c) into a frame relay network for reception by a frame relay access device capable of interfacing to an SS7 network.

2. A method for communicating a signaling system No.7 (SS7) protocol data stream between remotely located SS7 network elements, comprising steps of:

(a) receiving an SS7 protocol data stream from an SS7 network;

(b) distinguishing redundant data from essential data within the received SS7 data stream;

(c) encapsulating essential data in a frame packet form consistent with conventional frame relay network protocol and disregarding the redundant data; and (d) sending said encapsulated data over a frame relay network for reception by a frame relay access device capable of interfacing between said frame relay network and an SS7 signaling point.

* * * * *

UNITED STATES PATENT AND TRADEMARK OFFICE
CERTIFICATE OF CORRECTION

PATENT NO. : 5,974,052
DATED : October 26, 1999
INVENTOR(S) : B.E. Johnson et al.

It is certified that error appears in the above-identified patent and that said Letters Patent is hereby corrected as shown below:

COLUMN | LINE
[73] | 2 of text     After "Kans." insert --, Tekelec, Calabasas, CA--.
Pg. 1, col. 1

Signed and Sealed this

Twenty-second Day of May, 2001

*Attest:*

NICHOLAS P. GODICI

*Attesting Officer*     *Acting Director of the United States Patent and Trademark Office*